Patented Apr. 22, 1947

2,419,302

UNITED STATES PATENT OFFICE 2,419,302

GLASS AND PROCESS OF MANUFACTURE THEREOF

Harry A. Truby, New Kensington, Pa., assignor to Pittsburgh Plate Glass Company, Allegheny County, Pa., a corporation of Pennsylvania No Drawing. Application March 25, 1944, Serial No. 528,159

4 Claims. (Cl. 106—53)

The present invention relates to optical glasses and more particularly to the dense flint glasses which contain relatively large amounts of lead oxide.

One object of the invention is the provision of a dense flint glass which is substantially colorless.

A further object of my invention is to provide a process by means of which the yellow color characteristic of dense flint glass may be substantially eliminated.

Other objects and advantages of the invention will be apparent from the following detailed description of certain preferred embodiments thereof.

Glass compositions containing lead oxide in addition to silica and alkali metal oxides or other fluxing agents are generally considered to fall within the scope of the term "flint glass." These flint glasses are classified according to their lead oxide content into three groups: light, medium and dense flint. The class of dense flint glass usually is regarded to include those compositions which contain in excess of 45 percent by weight of lead oxide.

Dense flint glasses possess definite optical properties which make them particularly suitable for the production of lenses employed in various types of optical instruments. For example, these glasses have an index of refraction of from 1.620 to 1.720 and a dispersion factor of approximately 30.

One inherent disadvantage of the dense flint glasses is a characteristic yellow color, which obviously reduces the transparency of the glass and at the same time impedes free transmission of the full range of the color spectrum. Prior attempts to eliminate this yellow coloration have been unsuccessful in that alterations of the glass compositions have affected the optical properties thereof and moved them from within the recognized limits.

I have now ascertained that the addition of sodium sulphate to a dense flint glass batch will eliminate substantially all of the color in the glass produced from that batch. The amount of sodium sulphate necessary to accomplish this result will of course depend upon the depth of color which would normally be present in the dense flint glass produced from a standard batch containing no sodium sulphate. The intensity or depth of color varies considerably with changes in the batch composition, but under ordinary circumstances from 0.1 to 1.5 percent by weight of sodium sulphate will be sufficient to produce the desired effect.

The compositions of dense flint glasses may vary within relatively wide limits depending upon the specific optical properties which it is desired to obtain. The following table illustrates typical compositions, calculated from their respective batches, of substantially colorless dense flint glasses.

|  | I | II | III |
|---|---|---|---|
|  | Per cent | Per cent | Per cent |
| $SiO_2$ | 36.50 | 37.50 | 38.50 |
| PbO | 53.40 | 51.25 | 49.55 |
| $K_2O$ | 4.85 | 5.88 | 6.49 |
| $Na_2O$ | 1.06 | 1.25 | 1.42 |
| $TiO_2$ | 3.47 | 3.44 | 3.40 |
| $As_2O_5$ | .36 | .34 | .32 |
| $Na_2SO_4$ | .36 | .34 | .32 |

It will be readily apparent that various modifications in the nature of the several constituents in a particular batch and the percentage composition thereof are possible without departing from the spirit of the invention or the scope of the appended claims.

What I claim is:

1. A process of producing substantially colorless dense flint glass, which comprises adding sodium sulphate to a batch from which the glass is prepared, to eliminate the color normally resulting when the batch is melted.

2. A process of producing substantially colorless dense flint glass, which comprises adding from 0.1 to 1.5% by weight of sodium sulphate to a batch from which the glass is prepared to eliminate the color normally resulting when the batch is melted.

3. A dense flint glass containing in excess of 45% by weight of lead oxide which has been rendered substantially colorless by the inclusion of sodium sulfate in the batch from which it is prepared.

4. A dense flint glass formed by melting a glass batch which contains in excess of 45% by weight of lead oxide and sufficient sodium sulfate to eliminate the color normally resulting when the batch is melted.

HARRY A. TRUBY.

REFERENCES CITED

The following references are of record in the file of this patent:

UNITED STATES PATENTS

| Number | Name | Date |
|---|---|---|
| 1,166,922 | Mears | Jan. 4, 1916 |
| 1,287,005 | Handy | Dec. 10, 1918 |

FOREIGN PATENTS

| Number | Country | Date |
|---|---|---|
| 1,195 | British | 1880 |
| 15,743 | British | 1885 |